(12) United States Patent
Wang

(10) Patent No.: US 6,688,436 B1
(45) Date of Patent: Feb. 10, 2004

(54) BRAKE PAD ASSEMBLY FOR A BICYCLE

(75) Inventor: Kuo-Hsin Wang, Chang-Hua (TW)

(73) Assignee: Ah-Ping Lin, Changhua (TW)

( * ) Notice: Subject to any disclaimer, the term of this patent is extended or adjusted under 35 U.S.C. 154(b) by 0 days.

(21) Appl. No.: 10/338,292

(22) Filed: Jan. 7, 2003

(30) Foreign Application Priority Data

Sep. 30, 2002 (TW) ..................................... 91215457 U

(51) Int. Cl.$^7$ .............................................. B60T 17/22
(52) U.S. Cl. ................ 188/1.11 L; 340/454; 188/24.12
(58) Field of Search ....................... 188/1.11 E, 1.11 L, 188/24.12, 73.1; 340/454

(56) References Cited

U.S. PATENT DOCUMENTS

| | | | |
|---|---|---|---|
| 3,825,891 A | * 7/1974 | Kinast | 340/454 |
| 3,902,157 A | * 8/1975 | Kita | 340/454 |
| 4,009,465 A | * 2/1977 | Rigalt | 340/454 |
| 6,098,453 A | * 8/2000 | Chodkowski | 340/454 |
| 6,302,241 B1 | * 10/2001 | Gronowicz, Jr. | 188/1.11 L |

* cited by examiner

*Primary Examiner*—Christopher P. Schwartz
(74) *Attorney, Agent, or Firm*—Fulwider Patton Lee & Utecht, LLP

(57) ABSTRACT

A brake pad assembly includes an elastic pad body having a braking face, a mounting face formed with a battery-receiving recess to receive a battery, and a light emitting member mounted on an exterior of the pad body and having first and second spring terminals extending therefrom into the recess in such a manner that the first spring terminal constantly contacts a positive electrode of the battery and that the second spring terminal is spaced apart from a negative electrode of the battery. A pushing member is formed in the pad body, and is elastically deformable so as to push the second spring terminal to abut against the negative electrode upon deformation of the pad body when the braking face is compressed.

4 Claims, 5 Drawing Sheets

BRAKE PAD ASSEMBLY FOR A BICYCLE

CROSS REFERENCE TO RELATED APPLICATION

This application claims priority of Taiwan Application No. 091215457, filed on Sep. 30, 2002.

BACKGROUND OF THE INVENTION

1. Field of the Invention

The present invention relates to a brake pad assembly, more particularly to a brake pad assembly for a bicycle.

2. Description of the Related Art

Referring to FIG. 1, a conventional brake pad assembly is shown to include an elastic brake pad body 1 having a braking face 101 and a mounting face 102 that is opposite to the braking face 101 and that is mounted on a brake caliper 21 of a bicycle (not shown) via a mounting rod 11. The brake pad body 1 is elastically deformable when compressed by a wheel rim 2 of the bicycle during a braking operation.

The conventional brake pad assembly is disadvantageous in that it does not provide any warning during braking operation of the bicycle for avoiding occurrence of accidents.

SUMMARY OF THE INVENTION

Therefore, the object of this invention is to provide a brake pad assembly which includes a light emitting member mounted on an exterior of an elastic elongated pad body, and a battery disposed in the pad body and electrically coupled to the light emitting member such that the light emitting member is activated to emit a warning light upon a braking operation.

Accordingly, a brake pad assembly of the present invention includes: an elastic elongated pad body having a braking face and a mounting face opposite to the braking face, the mounting face being formed with a battery-receiving recess, the pad body being elastically deformable when compressed by a wheel rim of the bicycle during a braking operation; a battery received in the battery-receiving recess, and having a positive electrode adjacent to the mounting face and a negative electrode opposite to the positive electrode; a light emitting member mounted on an exterior of the pad body, and including first and second spring terminals extending therefrom into the battery-receiving recess in such a manner that the first spring terminal constantly abuts against the positive electrode and that the second spring terminal confronts and is spaced apart from the negative electrode; and a pushing member formed in the pad body, extending in a transverse direction relative to the braking and mounting faces toward the second spring terminal, and being elastically deformable so as to move in the transverse direction and to push the second spring terminal to move toward and to abut against the negative electrode upon deformation of the pad body when the braking face is compressed by the wheel rim during the braking operation, thereby activating the light emitting member to emit a warning light.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
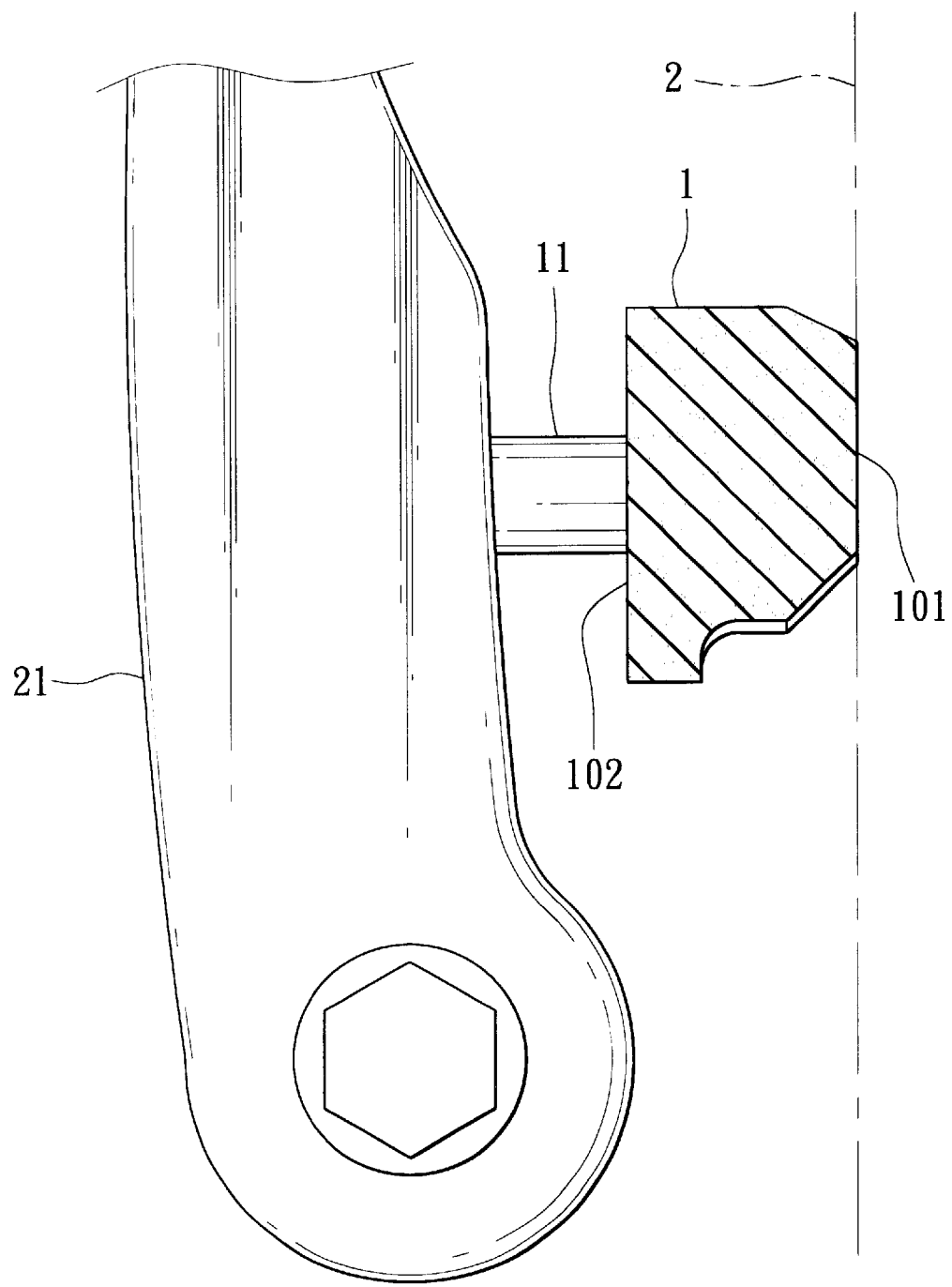
FIG. 1 is a sectional view of a conventional brake pad assembly when mounted on a brake caliper of a bicycle.
Figure 2:
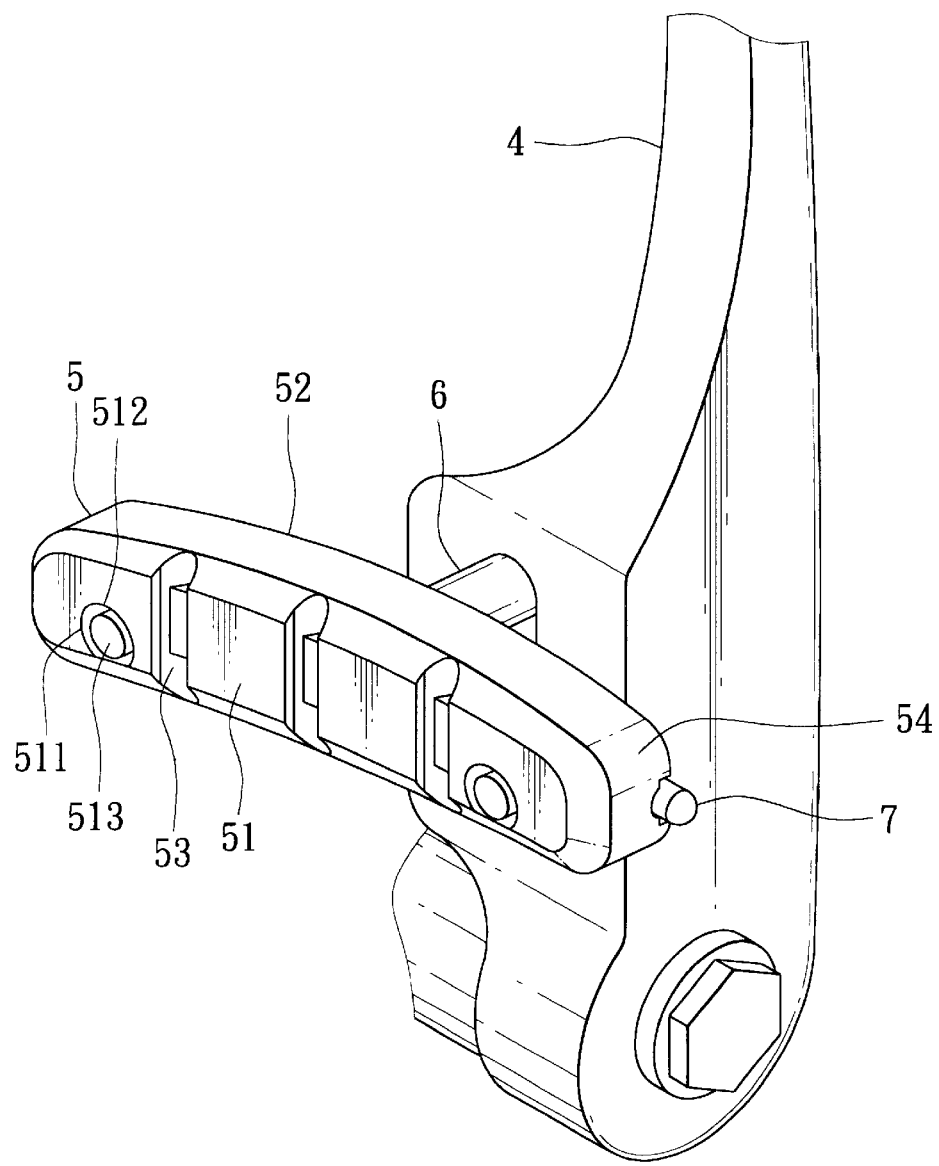
FIG. 2 is a perspective view of the preferred embodiment of a brake pad assembly according to the present invention, which is mounted on a brake caliper of a bicycle.
Figure 3:
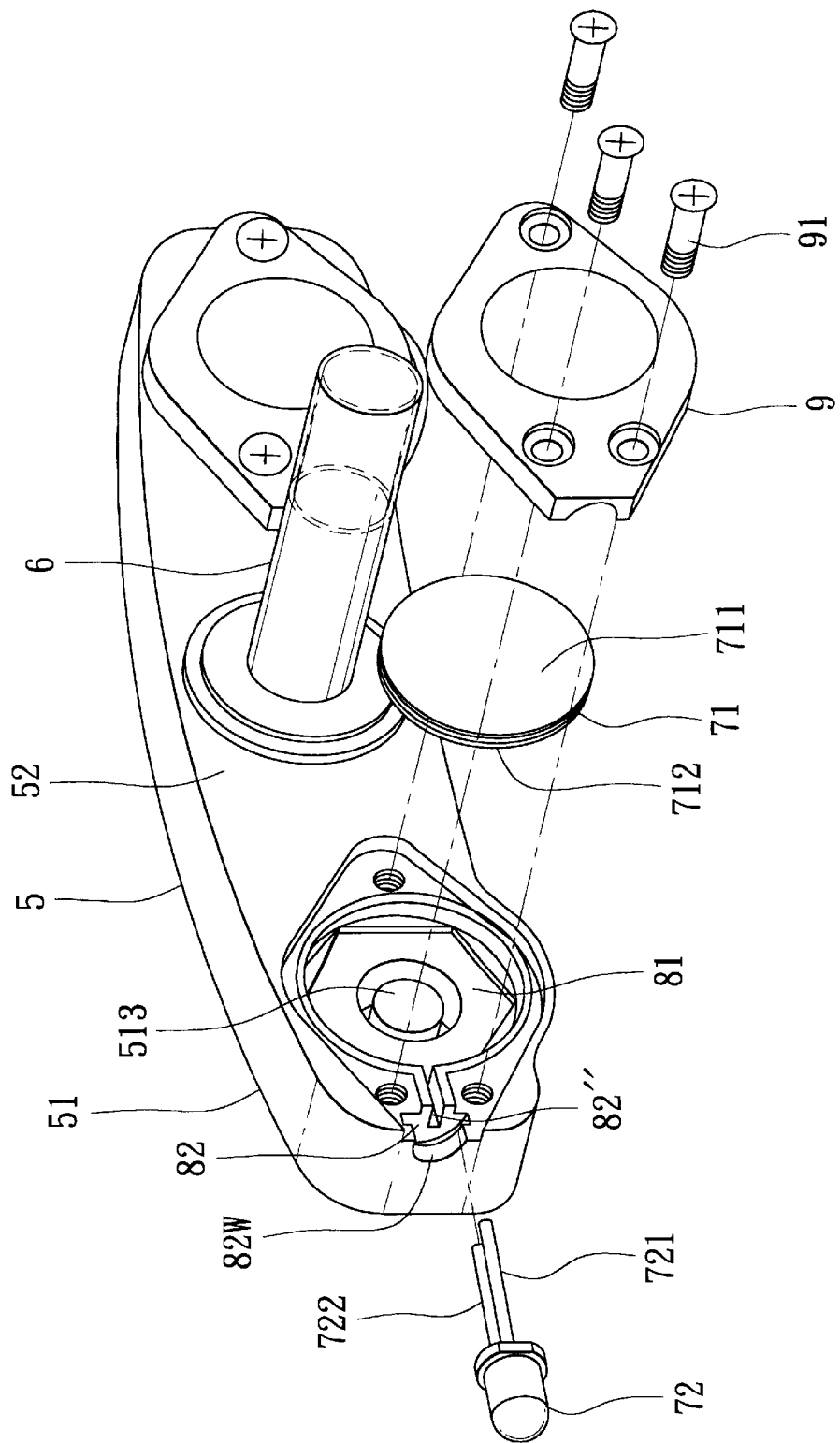
FIG. 3 is a partly exploded perspective view of the preferred embodiment.
Figure 4:
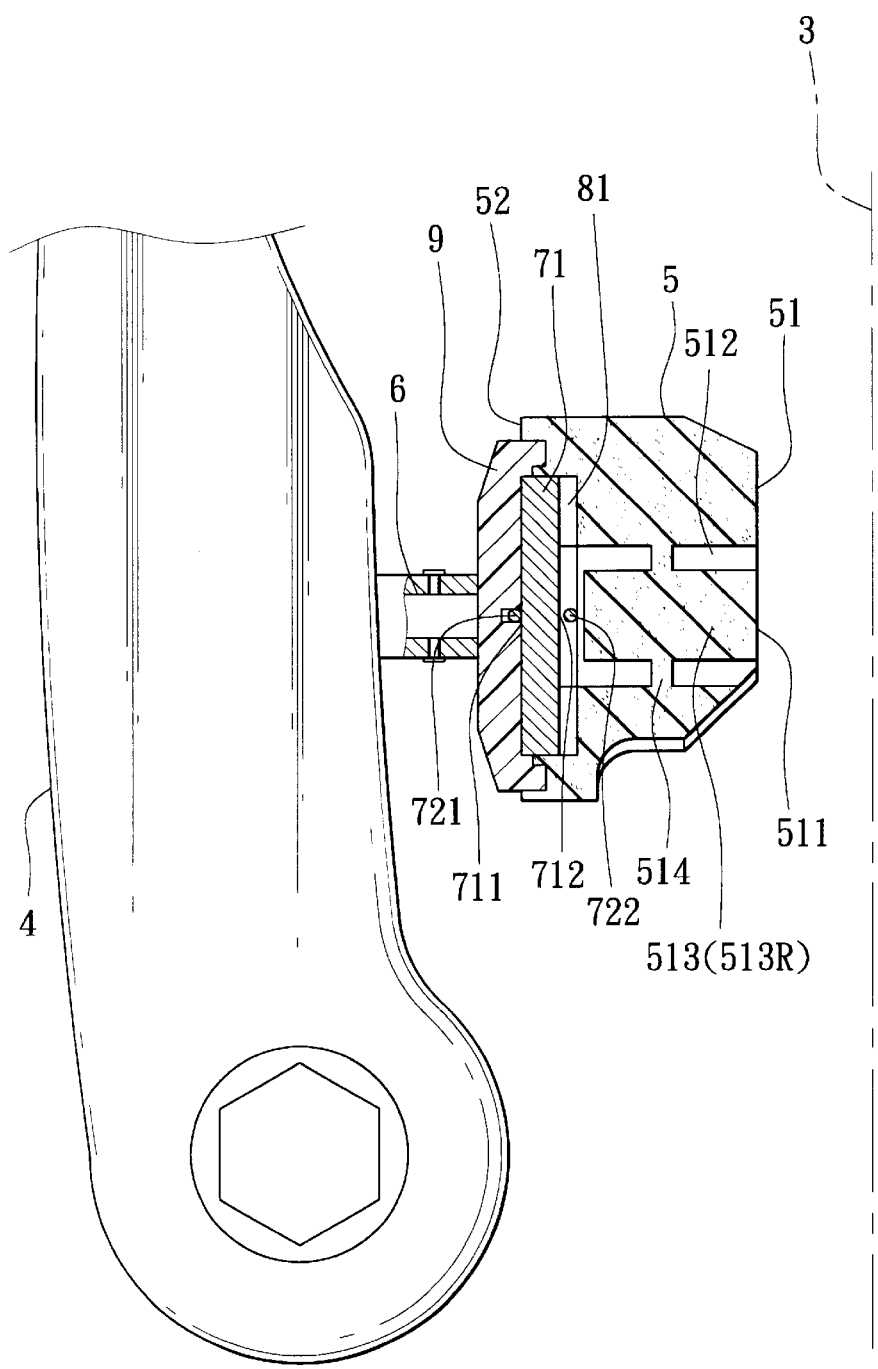
FIG. 4 is a sectional view of the preferred embodiment when mounted on the brake caliper of the bicycle, illustrating a state prior to a braking operation.

Referring to FIGS. 2, 3 and 4, the preferred embodiment of a brake pad assembly for a bicycle according to the present invention is shown to include an elastic elongated pad body 5, two batteries 71, two spaced apart light emitting members 7, and two pushing members 513.

As illustrated, the elongated pad body 5 has two opposite ends 54, a braking face 51, and a mounting face 52 opposite to the braking face 51. The mounting face 52 of the pad body 5 is formed with two battery-receiving recesses 81 that are respectively disposed adjacent to the opposite ends 54, and three grooves 53 that are disposed between the battery-receiving recesses 81 for providing suitable spaces to accommodate thermal expansion of the pad body 5 during a braking operation.

The batteries 71 are respectively received in the battery-receiving recesses 81. Each of the batteries 71 has a positive electrode 711 adjacent to the mounting face 52 and a negative electrode 712 opposite to the positive electrode 711.

The light emitting members 7 are mounted on an exterior of the pad body 5 adjacent respectively to the opposite ends 54 of the pad body 5. Each of the light emitting members 7 includes a bulb 72 having first and second spring terminals 721, 722, each of which extends therefrom into a respective one of the battery-receiving recesses 81 in such a manner that the first spring terminal 721 constantly abuts against the positive electrode 711 of a respective one of the batteries 71 and that the second spring terminal 722 confronts and is spaced apart from the negative electrode 712 of the respective one of the batteries 71.

Figure 5:
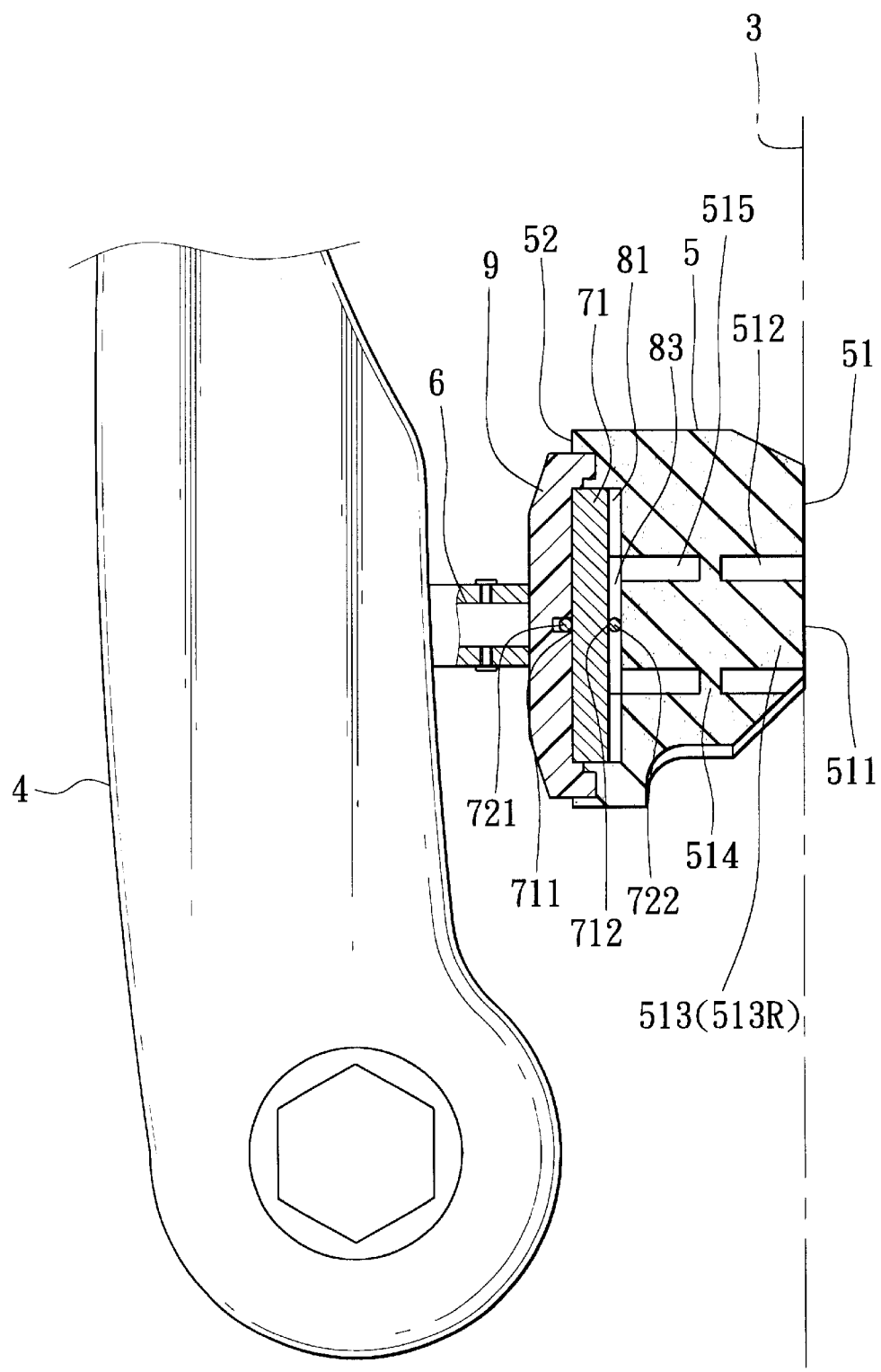
FIG. 5 is a sectional view of the preferred embodiment when mounted on the brake caliper of the bicycle, illustrating a state during the braking operation.

The pushing members 513 are formed in the pad body 5. Each of the pushing members 513 extends in a transverse direction relative to the braking and mounting faces 51, 52 toward the second spring terminal 722 of a respective one of the light emitting members 7. Each pushing member 513 is elastically deformable so as to move in the transverse direction and to push the second spring terminal 722 of the respective one of the light emitting members 7 to move toward and to abut against the negative electrode 712 of the respective one of the batteries 71 upon deformation of the pad body 5 when the braking face 51 of the pad body 5 is compressed by a wheel rim 3 of a bicycle (not shown) during the braking operation, as best shown in FIG. 5, thereby activating the light emitting member 7 to send out warning lights.

In this preferred embodiment, the pad body 5 is formed with two spaced apart through-holes 511. Each of the through-holes 511 is confined by a hole-defining wall 512 that extends in the transverse direction from the braking face 51 to the respective battery-receiving recess 81. Each of the pushing members 513 includes a pushing rod 513R and an annular flange 514. The pushing rod 513R is disposed in a respective one of the through-holes 511, is radially spaced apart from the hole-defining wall 512, and extends from the braking face 51 to the respective battery-receiving recess 81. The annular flange 514 extends radially and outwardly from the pushing rod 513R to connect with the respective one of the hole-defining walls 512 so as to permit displacement of the pushing rod 513R toward the second spring terminal 722 upon the braking operation.

Preferably, each of the opposite ends 54 of the pad body 5 is formed with a bulb-receiving recess 82 to permit seating of the bulb 72 of a respective one of the light emitting members 7 therein. The bulb-receiving recess 82 is confined by a recess-defining wall 82W that has a bottom wall portion formed with a terminal extension passage 82" which is in spatial communication with the respective battery-receiving recess 81. The first and second spring terminal 721, 722 of the bulb 72 of a respective one of the light emitting members 7 extend through the terminal extension passage 82" and into the respective battery-receiving recess 81.

Two shielding plates 9 are mounted on the mounting face 52 of the pad body 5 by the use of a plurality of screws 91 so as to cover the battery-receiving recesses 81, respectively. A mounting rod 6 is secured to the mounting face 52 of the pad body 5 at a middle portion of the pad body 5 for coupling with a brake caliper 4 of the bicycle (not shown).

With the inclusion of the light emitting members 7 and the batteries 71, the aforesaid disadvantage associated with the prior art can be eliminated.

With this invention thus explained, it is apparent that numerous modifications and variations can be made without departing from the scope and spirit of this invention. It is therefore intended that the invention be limited only as indicated in the appended claims.

I claim:

1. A brake pad assembly for a bicycle with a wheel rim, said brake pad assembly comprising:

an elastic elongated pad body having a braking face, and a mounting face opposite to said braking face, said mounting face being formed with a battery-receiving recess, said pad body being elastically deformable when compressed by the wheel rim during a braking operation;

a battery received in said battery-receiving recess, and having a positive electrode adjacent to said mounting face and a negative electrode opposite to said positive electrode;

a light emitting member mounted on an exterior of said pad body, and including first and second spring terminals extending therefrom into said battery-receiving recess in such a manner that said first spring terminal constantly abuts against said positive electrode and that said second spring terminal confronts with and is spaced apart from said negative electrode; and a pushing member formed in said pad body, extending in a transverse direction relative to said braking and mounting faces toward said second spring terminal, and being elastically deformable so as to move in said transverse direction and to push said second spring terminal to move toward and to abut against said negative electrode upon deformation of said pad body when said braking face is compressed by the wheel rim during the braking operation, thereby activating said light emitting member to emit a warning light.

2. The brake pad assembly as defined in claim 1, wherein said pad body is formed with a through-hole that is confined by a hole-defining wall and that extends in said transverse direction from said braking face to said battery-receiving recess, said pushing member including a pushing rod that is disposed in said through-hole, that is radially spaced apart from said hole-defining wall, and that extends from said braking face to said battery-receiving recess, and an annular flange extending radially and outwardly from said pushing rod to connect with said hole-defining wall so as to permit displacement of said pushing rod toward said second spring terminal upon the braking operation.

3. A brake pad assembly for a bicycle with a wheel rim, said brake pad assembly comprising:

an elastic elongated pad body having two opposite ends, a braking face, and a mounting face opposite to said braking face, said mounting face being formed with two battery-receiving recesses that are respectively disposed adjacent to said opposite ends, and a plurality of grooves that are disposed between said battery-receiving recesses, said pad body being elastically deformable when compressed by the wheel rim during a braking operation;

two batteries respectively received in said battery-receiving recesses, each of said batteries having a positive electrode adjacent to said mounting face and a negative electrode opposite to said positive electrode;

two spaced apart light emitting members mounted on an exterior of said pad body adjacent to said opposite ends of said pad body, respectively, each of said light emitting members including first and second spring terminals that extend therefrom into a respective one of said battery-receiving recesses in such a manner that said first spring terminal constantly abuts against said positive electrode of a respective one of said batteries and that said second spring terminal confronts and is spaced apart from said negative electrode of the respective one of said batteries;

two pushing members formed in said pad body, each of said pushing members extending in a transverse direction relative to said braking and mounting faces toward said second spring terminal of a respective one of said light emitting members and being elastically deformable so as to move in said transverse direction to push said second spring terminal of the respective one of said light emitting members to move toward and to abut against said negative electrode of the respective one of said batteries upon deformation of said pad body when said braking face is compressed by the wheel rim during the braking operation, thereby activating said light emitting member to emit a warning light; and a mounting rod secured to said mounting face at a middle portion of said pad body.

4. The brake pad assembly as defined in claim 3, wherein said pad body is formed with two spaced apart through-holes, each of said through holes being confined by a hole-defining wall that extends in said transverse direction from said braking face to a respective one of said battery-receiving recesses, each of said pushing members including a pushing rod that is disposed in a respective one of said through-holes, that is radially spaced apart from said hole-defining wall of the respective one of said through-holes, and that extends from said braking face to the respective one of said battery-receiving recesses, and an annular flange extending radially and outwardly from said pushing rod to connect with said hole-defining wall of the respective one of said through-holes so as to permit displacement of said pushing rod toward said second spring terminal of the respective one of said light emitting members upon the braking operation.

\* \* \* \* \*